US012771203B2

(12) United States Patent
Shi

(10) Patent No.: US 12,771,203 B2
(45) Date of Patent: Oct. 20, 2026

(54) MOTOR AND ELECTRICAL APPARATUS

(71) Applicant: NIDEC CORPORATION, Kyoto (JP)

(72) Inventor: Wenxian Shi, Dalian City (CN)

(73) Assignee: NIDEC CORPORATION, Kyoto (JP)

( * ) Notice: Subject to any disclaimer, the term of this patent is extended or adjusted under 35 U.S.C. 154(b) by 260 days.

(21) Appl. No.: 18/582,647

(22) Filed: Feb. 21, 2024

(65) Prior Publication Data

US 2024/0283322 A1 Aug. 22, 2024

(30) Foreign Application Priority Data

Feb. 22, 2023 (CN) ......................... 202320293129.0

(51) Int. Cl.
*H02K 5/15* (2006.01)

(52) U.S. Cl.
CPC ...................................... *H02K 5/15* (2013.01)

(58) Field of Classification Search
CPC ............... H02K 5/10; H02K 5/15; H02K 5/04
USPC ........................................................... 310/89
See application file for complete search history.

(56) References Cited

U.S. PATENT DOCUMENTS

| | | | | |
|---|---|---|---|---|
| 9,769,363 | B2 * | 9/2017 | Cho | H04N 23/57 |
| 9,872,407 | B2 * | 1/2018 | Inobe | H05K 5/03 |
| 9,949,394 | B2 * | 4/2018 | Kamoshida | H05K 5/0026 |
| 10,350,634 | B2 * | 7/2019 | Leggett | B05D 5/00 |
| 10,451,891 | B2 * | 10/2019 | Cho | G03B 3/10 |
| 10,897,177 | B2 * | 1/2021 | Sakuragi | H02K 1/278 |
| 11,088,594 | B2 * | 8/2021 | Hattori | B62D 5/04 |
| 11,349,371 | B2 * | 5/2022 | Imai | H02K 15/14 |
| 11,428,950 | B2 * | 8/2022 | Cho | G02B 27/646 |
| 11,451,105 | B2 * | 9/2022 | Park | H02K 5/10 |
| 11,522,408 | B2 * | 12/2022 | Hattori | H02K 3/04 |
| 11,588,367 | B2 * | 2/2023 | Ho | H02K 5/203 |
| 2016/0182775 | A1 * | 6/2016 | Cho | H04N 23/57 348/208.99 |
| 2016/0365779 | A1 * | 12/2016 | Watanabe | H02K 15/12 |
| 2017/0172006 | A1 * | 6/2017 | Kamoshida | H05K 5/06 |
| 2018/0254684 | A1 * | 9/2018 | Fang | H02K 5/203 |
| 2019/0199172 | A1 * | 6/2019 | Yoshino | H02K 9/06 |
| 2020/0321823 | A1 * | 10/2020 | Park | H02K 5/1732 |
| 2020/0366156 | A1 * | 11/2020 | Imai | H02K 11/33 |
| 2020/0381966 | A1 * | 12/2020 | Yoshida | H02K 1/185 |
| 2020/0381978 | A1 * | 12/2020 | Onishi | H02K 5/26 |
| 2022/0357589 | A1 * | 11/2022 | Cho | G03B 5/00 |

(Continued)

FOREIGN PATENT DOCUMENTS

| | | | | |
|---|---|---|---|---|
| CN | 208874391 | | 5/2019 | |
| JP | 2022128587 A | * | 9/2022 | H02K 5/16 |

*Primary Examiner* — Alex W Mok
(74) *Attorney, Agent, or Firm* — JCIPRNET

(57) ABSTRACT

A motor and an electrical apparatus are provided. The motor includes a housing and a cover. The cover includes a recess recessed on a surface from an axial side to an axial other side. The recess is located on a portion of an edge on a radially outer side of the cover. An edge on a radially outer side of the recess is in interference fit with an inner circumference of the housing. The surface of the cover on the axial side is used for being coated with an adhesive. By defining the recess on a portion of the edge of the cover and allowing the edge on the radially outer side of the recess to be in interference fit with the inner circumference of the housing, the processing process of the motor is simplified, and the adhesive is prevented from overflowing.

9 Claims, 6 Drawing Sheets

(56) References Cited

U.S. PATENT DOCUMENTS

| | | | | |
|---|---|---|---|---|
| 2023/0101359 | A1* | 3/2023 | Huang | H02K 5/173 310/418 |
| 2024/0258874 | A1* | 8/2024 | Shi | H02K 5/08 |

* cited by examiner

MOTOR AND ELECTRICAL APPARATUS

CROSS REFERENCE TO RELATED APPLICATIONS

The present disclosure claims priority under 35 U.S.C. § 119 to Chinese Application No. 202320293129.0 filed on Feb. 22, 2023, the entire content of which is incorporated herein by reference.

FIELD OF THE DISCLOSURE

The disclosure relates to the electromechanical field, and in particular, to a motor and an electrical apparatus.

BACKGROUND

A conventional motor is configured with a housing that accommodates the internal structure of the motor and a cover that covers an opening of the housing. For instance, the housing and cover of the motor are fixed by interference fit throughout the entire circumference.

However, in the method of fixing the housing and the cover through interference fit throughout the entire circumference, the entire circumference of the cover needs to be processed, and the processing process is complicated and time-consuming. Further, when connecting the motor and external components, it is necessary to apply adhesive (bonding agent) to the surface of the cover. In this case, the adhesive may easily overflow to the outside of the housing, thereby contaminating the outer surface of the motor and even affecting the smooth progress of subsequent processing processes.

It should be noted that the above introduction to the technical background is only set forth to facilitate a clear and complete description of the technical solutions of the disclosure and to facilitate understanding of a person having ordinary skill in the art. It should not be considered that the above technical solutions are well-known to a person having ordinary skill in the art just because these solutions are described in the BACKGROUND section of the disclosure.

SUMMARY

In order to solve at least one of the above problems or other similar problems, the exemplary embodiments of the disclosure provide a motor and an electrical apparatus capable of simplifying the processing process of the motor and preventing the adhesive from overflowing.

An exemplary embodiment of the first aspect of the disclosure provides a motor including a housing and a cover. The cover includes a recess recessed on a surface of the cover from an axial side to an axial other side. The recess is located on a portion of an edge on a radially outer side of the cover. An edge on a radially outer side of the recess is in interference fit with an inner circumference of the housing. The surface of the cover on the axial side is used for being coated with an adhesive.

An exemplary embodiment of the second aspect of the disclosure provides the motor as described in the first aspect. Herein, the number of the recess is plural, and the recesses include a first recess and a second recess. Herein, a width of an edge of the housing on the radially outer side of the first recess is less than or equal to a predetermined threshold. The width of the edge of the housing on the radially outer side of the second recess is greater than the predetermined threshold. A volume of the first recess is greater than a volume of the second recess.

An exemplary embodiment of the third aspect of the disclosure provides the motor as described in the second aspect. Herein, the volume of the recess corresponding to a narrowest portion of the edge of the housing is the largest.

An exemplary embodiment of the fourth aspect of the disclosure provides the motor as described in the second aspect. Herein, the first recess is centered on a narrowest portion of the edge of the housing adjacent to the first recess and extends along both sides of the edge of the housing in a circumferential direction. Viewed in an axial direction, a cross-section of the first recess is substantially strip-shaped extending in the circumferential direction, and/or viewed in the axial direction, a cross-section of the second recess is a portion of a substantially-circular circle.

An exemplary embodiment of the fifth aspect of the disclosure provides the motor as described in the second aspect. Herein, when the number of the second recess is plural, shapes of the second recesses are the same.

An exemplary embodiment of the sixth aspect of the disclosure provides the motor as described in the first aspect. Herein, the cover further includes an ear portion protruding towards the radially outer side. The ear portion is located on a portion of the edge on the radially outer side of the cover. Viewed in a radial direction, the ear portion and the recess do not overlap. The housing includes an accommodating portion for accommodating the ear portion.

An exemplary embodiment of the seventh aspect of the disclosure provides the motor as described in the sixth aspect. Herein, the number of the ear portion is plural, and the ear portions are uniformly distributed in a circumferential direction substantially.

An exemplary embodiment of the eighth aspect of the disclosure provides the motor as described in the sixth aspect. Herein, an edge of the housing includes a hole portion. The recess of the cover is located on both sides of the hole portion in a circumferential direction. A width of the edge of the housing on the radially outer side of the recess is less than the width of the edge of the housing at the hole portion.

An exemplary embodiment of the ninth aspect of the disclosure provides the motor as described in the eighth aspect. Herein, the hole portion is disposed on the edge of the housing on a radially outer side of the ear portion.

An exemplary embodiment of the tenth aspect of the disclosure provides an electrical apparatus. Herein, the electrical apparatus includes the motor as described in any one of the above aspects.

The above and other elements, features, steps, characteristics and advantages of the present disclosure will become more apparent from the following detailed description of the preferred embodiments with reference to the attached drawings.

BRIEF DESCRIPTION OF THE DRAWINGS

The included drawings are used to provide a further understanding of the exemplary embodiments of the disclosure, which constitute a part of the specification, are used to illustrate the exemplary embodiments of the disclosure, and together with the text description, explain the principle of the disclosure. Obviously, the accompanying drawings in the following description are only some exemplary embodiments of the disclosure, and for a person having ordinary skill in the art, other drawings may be obtained based on these accompanying drawings without creative labor.

DESCRIPTION OF THE EMBODIMENTS

With reference to the accompanying drawings, the foregoing and other features of the disclosure becomes apparent through the following specification. In the specification and drawings, specific implementations of the disclosure are specifically disclosed, which indicate some implementations in which the principles of the disclosure may be adopted. It will be understood that the disclosure is not limited to the described implementations but includes all modifications, variations, and equivalents falling within the scope of the appended claims.

In addition, in each of the drawings used in the following specification, the structural elements are of a size that can be recognized on the drawings, and therefore, the scale differs depending on the structural elements. The disclosure is not limited to the number of structural elements, the shapes of the structural elements, the size ratios of the structural elements, and the relative positional relationships among the structural elements described in these drawings.

In the exemplary embodiments of the disclosure, the terms "first", "second", etc. are used to distinguish different elements in terms of appellations, but do not indicate the spatial arrangement or temporal order of these elements, and these elements should not be limited by these terms. The term "and/or" includes any and all combinations of one or more of the associated listed items. The terms such as "including" and "having" are intended to specify the presence of stated features, elements, devices, or components, but do not exclude the presence or addition of one or more other features, elements, devices, or components.

In the exemplary embodiments of the disclosure, the singular forms "a", "the", etc. are intended to include the plural forms and should be broadly understood as "a type" or "a class" rather than being limited to the meaning of "one". In addition, the term "said" should be understood to include both singular and plural forms, unless the context clearly indicates otherwise. Besides, the term "according to" should be understood as "according at least in part to", and the term "based on" should be understood as "based at least in part on", unless the context clearly indicates otherwise.

In the exemplary embodiments of the disclosure, the direction parallel to the direction extending along the central axis of the rotation shaft of the motor is called an "axial direction", the radial direction centered on the central axis is called a "radial direction", and the direction around the central axis is called a "circumferential direction". It should be noted that the definition of each direction in this specification is only for the convenience of describing the exemplary embodiments of the disclosure and does not limit the direction of the motor during use and manufacturing.

Figure 1:
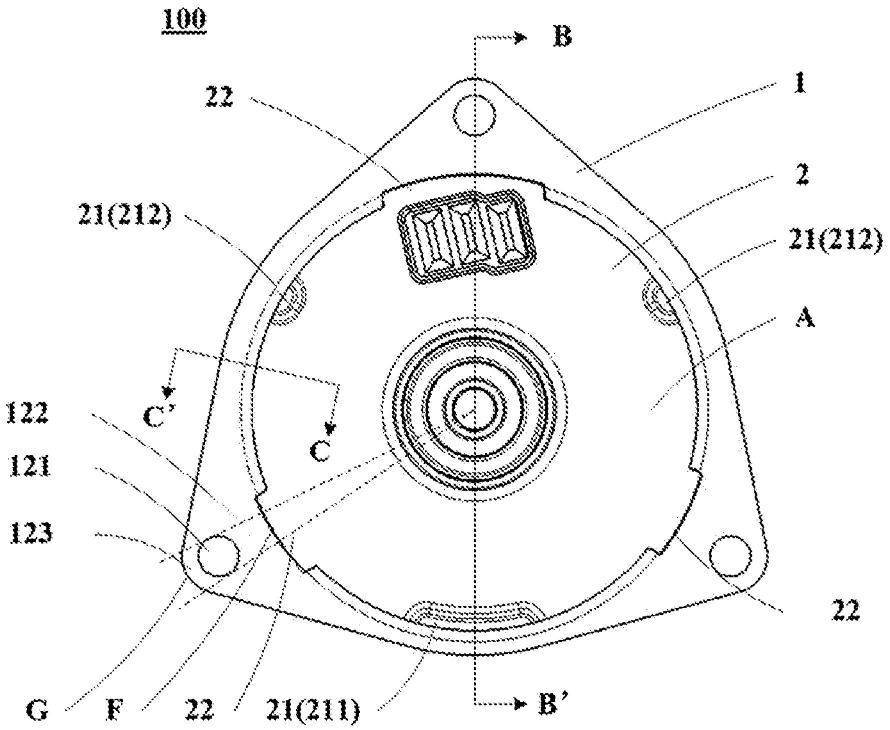
FIG. 1 is a top view of a motor according to an exemplary embodiment of the first aspect of the disclosure.
Figure 2:
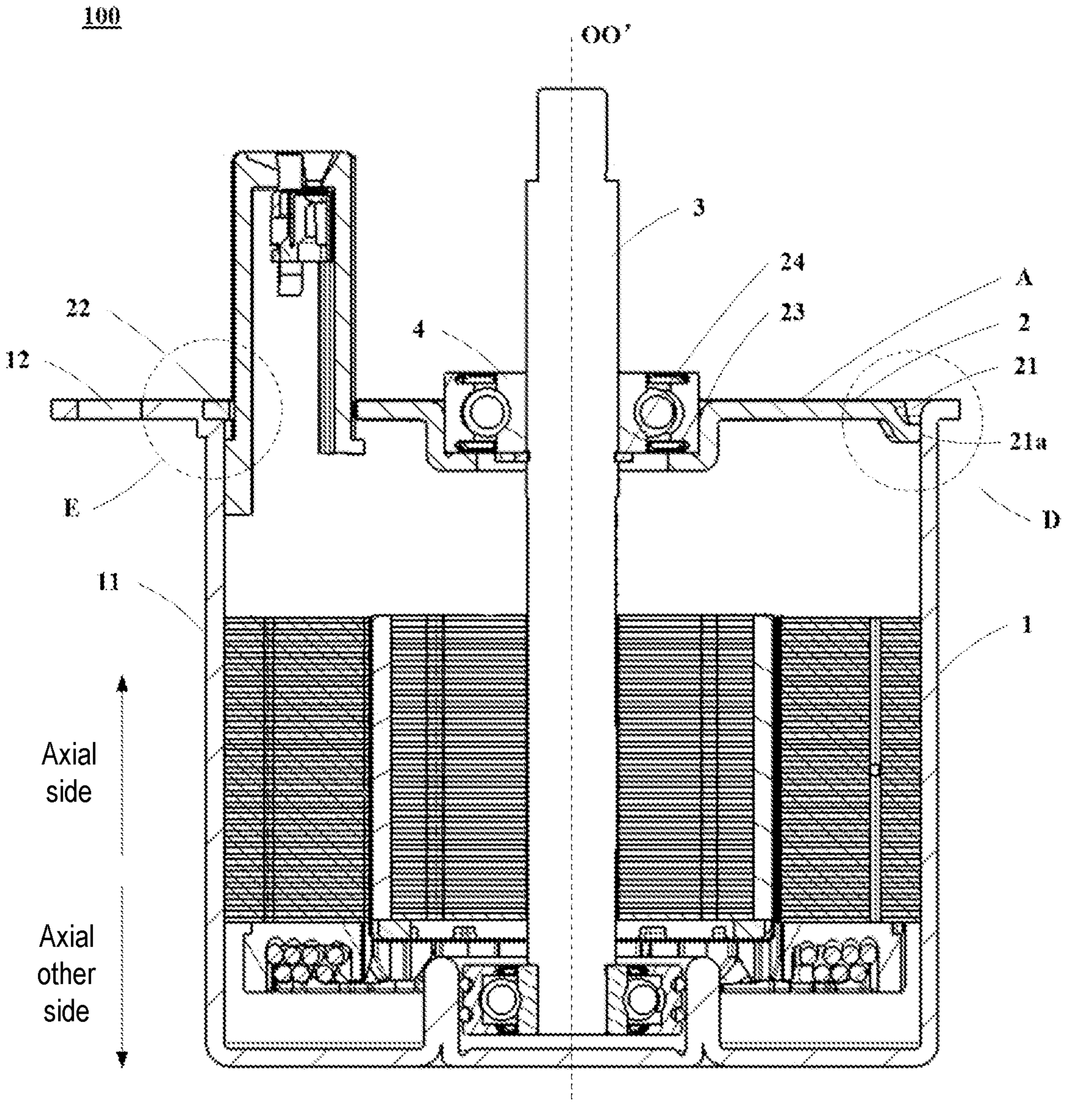
FIG. 2 is a cross-sectional view of the motor according to an exemplary embodiment of the first aspect of the disclosure.

An exemplary embodiment of the first aspect of the disclosure provides a motor. FIG. 1 is a top view of a motor 100 according to an exemplary embodiment of the first aspect of the disclosure. FIG. 2 is a cross-sectional view of the motor 100 according to an exemplary embodiment of the first aspect of the disclosure, and FIG. 2 is a cross-sectional view along the cross-sectional line BB' shown in FIG. 1.

In some exemplary embodiments, as shown in FIG. 1 and FIG. 2, the motor 100 includes a housing 1 and a cover 2. Herein, the cover 2 includes a recess 21 recessed on a surface A of the cover 2 from an axial side to an axial other side. The recess 21 is located on a portion of an edge on a radially outer side of the cover 2. An edge 21*a* (shown in FIG. 2) on a radially outer side of the recess 21 is in interference fit with an inner circumference of the housing 1. The surface A of the cover 2 on the axial side is used for being coated with an adhesive.

According to the above exemplary embodiments, by defining the recess 21 on a portion of the edge of the cover 2 and allowing the edge 21*a* on the radially outer side of the recess 21 to be in interference fit with the inner circumference of the housing 1, the cover 2 and the housing 1 may be fixed. Since only a portion of the edge of the cover 2 needs to be processed into a form of interference fit with the housing 1, the processing process of the cover 2 may be simplified, so that the processing process of the motor 100 is further simplified. Besides, the recess 21 is recessed on the surface A of the cover 2 from the axial side to the axial other side. Therefore, when the surface A of the cover 2 on the axial side is coated with the adhesive, excess adhesive may be accommodated in the recess 21, and that the adhesive coated on the cover 2 is prevented from overflowing.

In some exemplary embodiments, as shown in FIG. 2, the housing 1 may include a housing barrel 11 and a housing edge 12 (the edge of the housing 1 in the exemplary embodiments of the disclosure may be equivalently replaced by the housing edge 12). The housing barrel 11 is, for example, substantially cylindrical in shape, and is used to accommodate internal components of the motor 100, such as a stator, a rotor, an electronic component, a bearing, part of a rotating shaft, and the like. The housing edge 12 extends from an end portion on an axial side of the housing barrel 11 to a radially outer side.

Figure 3:
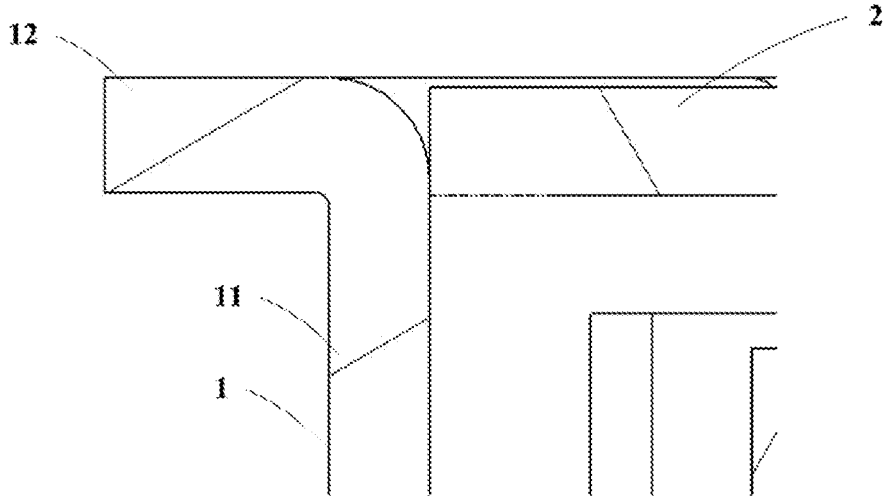
FIG. 3 is another cross-sectional view of the motor according to an exemplary embodiment of the first aspect of the disclosure.

FIG. 3 is another cross-sectional view of the motor 100 according to an exemplary embodiment of the first aspect of the disclosure. Herein, FIG. 3 is a cross-sectional view along the cross-sectional line CC' shown in FIG. 1. In some exemplary embodiments, as shown in FIG. 3, an R corner may be defined at the connection between the housing barrel 11 and the housing edge 12, so stress concentration may thus be avoided.

The disclosure is not limited thereto, and the housing 1 may also have other structures. For instance, the housing 1 may not have to be configured with the housing edge 12, or a C corner is defined or no chamfer and the like is configured at the connection between the housing barrel 11 and the housing edge 12.

In some embodiments, as shown in FIG. 2, the cover 2 may be substantially plate-shaped and is used to cover an opening of the housing 1. Herein, the plate-shaped or substantially plate-shaped edge has no flanging. In this case, an outer circumference of the plate-shaped or substantially plate-shaped edge directly abuts against an inner wall of the housing, and molding is thereby simplified. However, the cover 2 may also be other plate-shaped or substantially plate-shaped structures with flanges. The cover 2 may be set in a corresponding shape according to the specific structure of the motor 100. For instance, as shown in FIG. 2, the cover 2 may have a substantially circular plate shape. A through hole 24 for accommodating a rotating shaft 3 of the motor 100 and a bearing receiver 23 for accommodating a bearing 4 of the motor 100 may be configured at the center of the cover 2. The disclosure is not limited thereto, and the cover 2 may also have other structures.

In some exemplary embodiments, the adhesive may be applied to various regions of the surface A of the cover 2 as necessary. For instance, the adhesive or the like is applied in a substantially annular region extending by a predetermined distance from the edge on the radially outer side to a radially inner side of the cover 2.

In some exemplary embodiments, as shown in FIG. 2, the cover 2 is in interference fit with the inner circumference of the housing 1 through the edge 21*a* on the radially outer side of the recess 21 at the position where the recess 21 is defined. As shown in FIG. 2 and FIG. 3, the cover 2 may be in contact with the R corner of the housing 1 at other positions. Due to the formation of the recess 21 that is recessed closer to the axial other side than the R corner of the housing 1, the edge 21*a* of the recess 21 is in contact with the inner circumference closer to the axial other side than the R corner of the housing 1. In this way, a contact area and strength between the edge 21*a* of the recess 21 and the inner circumference of the housing 1 may be ensured, and a reliable interference fit is achieved.

Figure 4:
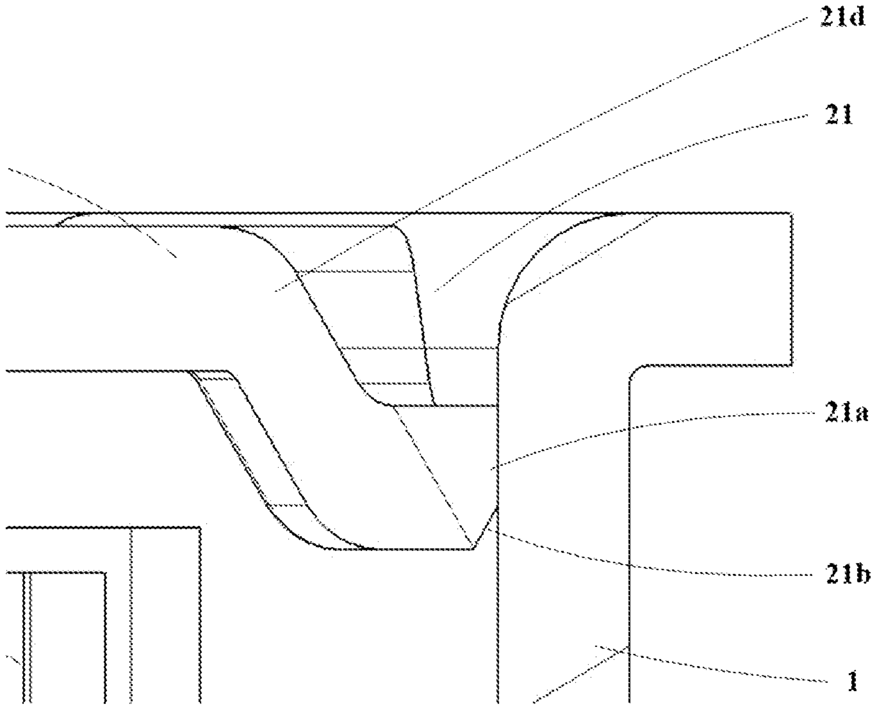
FIG. 4 is another cross-sectional view of the motor according to an exemplary embodiment of the first aspect of the disclosure.

FIG. 4 is another cross-sectional view of the motor 100 according to an exemplary embodiment of the first aspect of the disclosure. FIG. 4 shows an example of a structure within the range of the dotted circle D in FIG. 2. In some exemplary embodiments, as shown in FIG. 4, the cover 2 may include a step portion 21*d* located on a portion of the edge on the radially outer side of the cover 2. The step portion 21*d* surrounds the recess 21.

Figure 5:
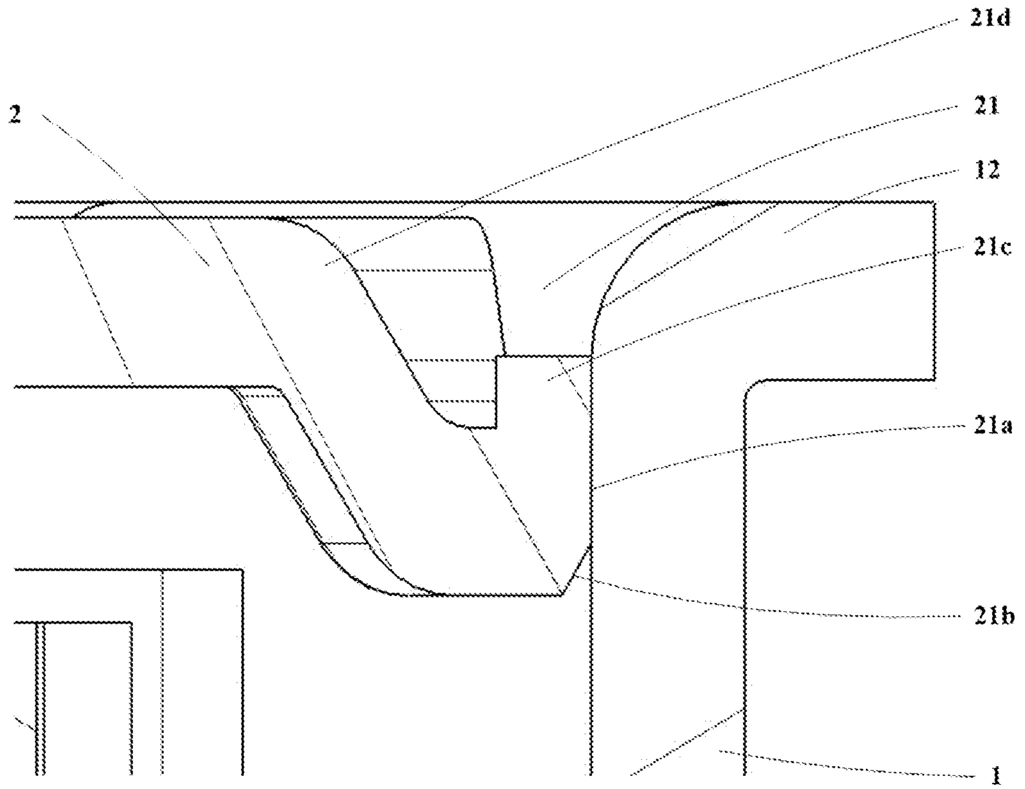
FIG. 5 is another cross-sectional view of the motor according to an exemplary embodiment of the first aspect of the disclosure.

FIG. 5 is another cross-sectional view of the motor 100 according to an exemplary embodiment of the first aspect of the disclosure. FIG. 5 shows another example of a structure within the range of the dotted circle D in FIG. 2. In some exemplary embodiments, as shown in FIG. 5, the cover 2 may further include a wall portion 21*c* extending from the edge 21*a* along the axial side. The step portion 21*d* and the wall portion 21*c* surround the recess 21. Herein, an end surface on an axial side of the wall portion 21*c* is positioned flush with an end surface on an axial side of the housing edge 12 or is located closer to the axial other side than the end surface on the axial side of the housing edge 12, so that interference with external components of the motor 100 may be avoided. The disclosure is not limited thereto. For instance, the wall portion 21 of the cover 2 may also extend from the edge 21*a* along the axial other side, or the cover 2 may also define the recess 21 through other structures.

In some embodiments, as shown in FIG. 5, the edge 21*a* on the radially outer side of the recess 21 is configured with a chamfer 21*b*. This facilitates assembly of the cover 2 and the housing 1. The disclosure is not limited thereto. For instance, the edge 21*a* on the radially outer side of the recess 21 may not be configured with a chamfer.

In some embodiments, the recess 21 of the cover 2 may be 1 or more than 1. When the number of the recesses 21 is more than one, shapes of the recesses 21 may be the same or different. For instance, as shown in FIG. 1, when the number of the recesses 21 is more than one, the more than one recesses 21 may include a first recess 211 and second recesses 212. Herein, a volume of the first recess 211 is greater than a volume of each second recess 212. A width of the edge of the housing 1 on the radially outer side of the first recess 212 is less than or equal to a predetermined threshold, and the width of the edge of the housing on the radially outer side of each second recess 212 is greater than the predetermined threshold. In the cover 2, by arranging the first recess 211 on the radially inner side of the narrower housing edge 12 to be larger than each second recess 212 located on the radially inner side of the wider housing edge 12, the adhesive may be prevented from overflowing from the narrower portion of the housing edge 12.

In some exemplary embodiments, as shown in FIG. 1, the number of the first recess 211 may be one, but the disclosure is not limited thereto. The number of the first recess 211 may also be more than 1. As shown in FIG. 1, the number of the second recesses 212 may be more than 1, but the disclosure is not limited thereto. The number of the second recess may also be 1. As shown in FIG. 1, the more than one recesses 21 may include two different shapes, but the disclosure is not limited thereto. The shapes of the more than one recesses 21 may be the same, so that the molding operation of the cover 2 may be simplified. Alternatively, the more than one recesses 21 also include two or more different shapes. In this way, the arrangement of the recesses 21 may be more flexible, the adhesive may be more reliably prevented from overflowing, and a bonding area of the motor 21 and an external component may be ensured.

In some exemplary embodiments, the width of the housing edge 12 is, for example, the size of the housing edge 12 in the radial direction, for example, in the radial direction, the distance from the end portion on the radially inner side to the end portion on the radially outer side of the housing edge 12.

In some exemplary embodiments, the predetermined threshold for the width of the housing edge 12 may be various values set according to actual conditions. For example, the predetermined threshold may be 5.5 mm, etc. For instance, the volume of the recess 21 of the cover 2 at the corresponding position where the width of the housing edge 12 is less than 5.5 mm (including 5.5 mm) is greater than the volume of the recess 21 at the corresponding position where the width of the housing edge 12 is more than 5.5 mm (excluding 5.5 mm).

In some exemplary embodiments, the volume of the recess 21 corresponding to a narrowest portion of the edge of the housing 1 is the largest. This can effectively prevent the adhesive from overflowing from the place where adhesive overflow is most likely to occur (i.e., the narrowest portion of the housing edge 12).

Figure 6:
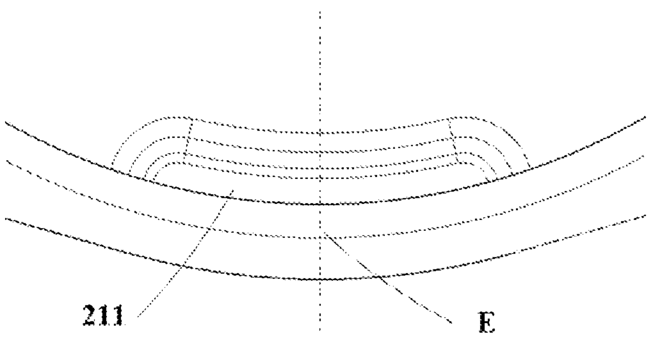
FIG. 6 is a schematic view of a first recess according to an exemplary embodiment of the first aspect of the disclosure.

FIG. 6 is a schematic view of a first recess according to an exemplary embodiment of the first aspect of the disclosure. As shown in FIG. 6, the first recess 211 is centered on a narrowest portion E of the edge of the housing 1 adjacent to the first recess 211 and extends along both sides of the edge of the housing 1 in the circumferential direction. Viewed in the axial direction, a cross-section of the first recess 211 is substantially strip-shaped extending in the circumferential direction. As such, the volume of the first recess 211 may be appropriately increased, so the adhesive is further prevented from overflowing from the narrowest portion of the edge of the housing 1.

For instance, when the width of the housing edge 12 is less than 5.5 mm, the first recess 211 is centered on the narrowest portion E of the housing edge 12, extends to both sides in the circumferential direction, and is strip-shaped or substantially strip-shaped extending in the circumferential direction.

Figure 7:
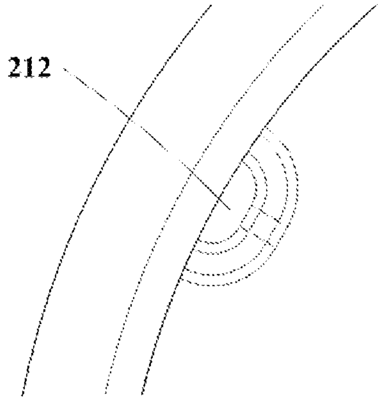
FIG. 7 is a schematic view of a second recess according to an exemplary embodiment of the first aspect of the disclosure.
Figure 8:
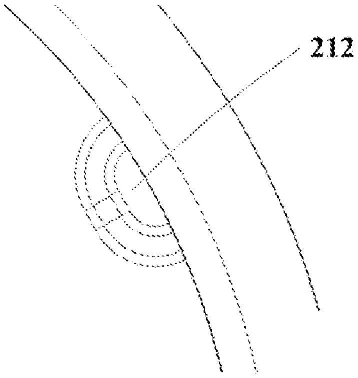
FIG. 8 is another schematic view of the second recess according to an exemplary embodiment of the first aspect of the disclosure.

FIG. 7 and FIG. 8 are schematic views of a second recess according to an exemplary embodiment of the first aspect of the disclosure. In some exemplary embodiments, as shown in FIG. 7 and FIG. 8, viewed in the axial direction, a cross-section of the second recess 212 is a portion of a substantially-circular circle. Therefore, the size of the second recess 212 in the circumferential direction may be appropriately reduced, and that a bonding range of the adhesive in the circumferential direction is ensured.

For instance, when the width of the housing edge 12 is greater than 5.5 mm, the cross-section of the corresponding second recess 212 may be approximately semicircular.

In some exemplary embodiments, when the number of the second recess 212 is plural, the shapes of the second recesses 212 may be the same. Alternatively, when the number of the first recess 211 is plural, the shapes of the first recesses 211 may be the same. This facilitates the molding of the cover 2. The disclosure is not limited thereto, and the shapes of the second recesses 212 may also be different, or the shapes of the first recesses 211 may also be different.

In some exemplary embodiments, when the number of the recesses 21 is plural, the recesses 21 may be uniformly distributed in the circumferential direction substantially. In this way, the cover 2 and the housing 1 may be reliably fixed. For instance, the number of the recesses 21 is three, and the centers of the recesses 21 are distributed at a distance of 120°. The disclosure is not limited thereto, and the recesses 21 may also be distributed in other ways.

Figure 9:
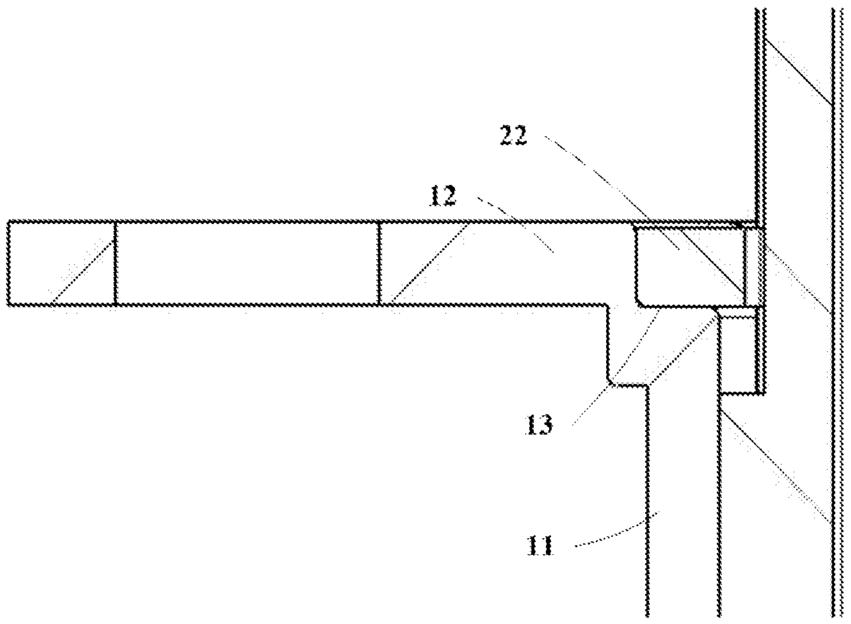
FIG. 9 is another cross-sectional view of the motor according to an exemplary embodiment of the first aspect of the disclosure.

In some exemplary embodiments, as shown in FIG. 1 and FIG. 2, the cover 2 may further include an ear portion 22 protruding towards the radially outer side. The ear portion 22 is located on a portion of the edge on the radially outer side of the cover 2. Viewed in the radial direction, the ear portion 22 and the recess 21 do not overlap. FIG. 9 is another cross-sectional view of the motor 100 according to an exemplary embodiment of the first aspect of the disclosure and shows another example of a structure within the range of the dotted circle E in FIG. 2. As shown in FIG. 9, the housing 1 may include an accommodating portion 13 for accommodating the ear portion 22. By arranging the ear portion 22 and the accommodating portion 13 for accommodating the ear portion 22, the cover 2 may be limited in the axial direction. For instance, when the recess 21 is defined, the cover 2 may be prevented from sinking into the inside of the housing 1, and the cover 2 may also be positioned in the circumferential direction.

In some embodiments, as shown in FIG. 9, the accommodating portion 13 of the housing 1 for accommodating the ear portion 22 may be a stepped structure located on the inner circumference of the housing 1. In this way, the accommodating portion 13 may be defined in a simple form. The disclosure is not limited thereto, and the accommodating portion 13 may also have other structures. For instance, the housing 1 may also include a protrusion or a groove configured on a surface on an axial side of the stepped structure. A surface on an axial other side of the ear portion 22 may be configured with a groove or a through hole that engages with the protrusion or a protrusion that engages with the groove, so that the cover 2 may be more reliably limited.

In some exemplary embodiments, when the ear portion 22 is accommodated in the accommodating portion 13, a surface on an axial side of the ear portion 22 is flush with a surface on an axial side of the edge of the housing 1 or is located closer to the axial other side than the surface on the axial side of the edge of the housing 1. In this way, the cover 2 may be prevented from interfering with other portions.

In some embodiments, the number of the ear portion 22 may be 1 or more than 1. When there are plural ear portions 22, shapes of the ear portions 22 may be the same, so that the molding of the cover 2 may be easily performed. Alternatively, the shapes of the ear portions 22 may be different, so that the ear portions 22 may be flexibly arranged.

When the number of the ear portions 22 is plural, the ear portions 22 may be uniformly distributed in the circumferential direction substantially. In this way, the cover 2 may be more reliably limited. For instance, the number of the ear portions 22 is three, and the centers of the ear portions 22 are distributed at a distance of 120°. The disclosure is not limited thereto, and the ear portions 22 may also be distributed in other ways.

In some exemplary embodiments, as shown in FIG. 1, the edge of the housing 1 may include a hole portion 121. The recess 21 of the cover 2 may be located on both sides of the hole portion 121 in the circumferential direction. The width of the edge of the housing 1 on the radially outer side of the recess 21 may be less than the width of the edge of the housing 1 at the hole portion 121. Therefore, the edge of the housing 1 does not occupy extra space at the position outside the hole portion 121, which is beneficial to miniaturization of the motor 100. Further, arranging the hole portion 121 on the wider portion of the edge of the housing 1 allows the hole portion 121 to be easily defined and manufactured.

In some exemplary embodiments, as shown in FIG. 1, the edge of the housing 1 at the hole portion 121 includes, for example, a housing edge 122 on a radially inner side and a housing edge 123 on a radially outer side of the hole portion 121. The width of the edge of the housing 1 at the hole portion 121 is a dimension in the radial direction, for example, from an end portion F on a radially inner side of the housing edge 122 on the radially inner side of the hole portion 121 to an end portion G on a radially outer side of the housing edge 123 on an radially outer side of the hole portion 121. The disclosure is not limited thereto, the edge of the housing 1 at the hole portion 121 and the width of the edge of the housing 1 at the hole portion 121 may also have other meanings.

In some embodiments, the hole portion 121 may be a fixing hole for fixing the motor 100. The number and position of the hole portion 121 may be set according to actual needs. For instance, the number of the hole portion 121 may be 1 or more than 1. When the number of the hole portion 121 is greater than 1, each hole portion 121 may be distributed uniformly in the circumferential direction substantially, so that the motor 100 may be reliably fixed. The disclosure is not limited thereto, and the hole portions 121 may also be distributed in other ways.

In some embodiments, as shown in FIG. 1, the hole portion 121 is configured on the edge of the housing 1 on the radially outer side of the ear portion 22. Since the edge of the housing 1 defining the hole portion 121 has a large width, it is easy to define the accommodating portion 13 on which the ear portion 22 is mounted at a corresponding position of the housing 1. The disclosure is not limited thereto, and the hole portion 121 may also be disposed at other positions.

According to the above exemplary embodiments, by defining the recess 21 on a portion of the edge of the cover 2 and allowing the edge 21*a* on the radially outer side of the recess 21 to be in interference fit with the inner circumference of the housing 1, the cover 2 and the housing 1 may be fixed. Since only a portion of the edge of the cover 2 needs to be processed into a form of interference fit with the housing 1, the processing process of the cover 2 may be simplified, so that the processing process of the motor 100 is further simplified. Besides, the recess 21 is recessed on the surface A of the cover 2 from the axial side to the axial other side. Therefore, when the surface A of the cover 2 on the axial side is coated with the adhesive, excess adhesive may be accommodated in the recess 21, and that the adhesive coated on the cover 2 is prevented from overflowing.

The second aspect of the disclosure provides an electrical apparatus, and the electrical apparatus includes the motor 1 as described in the exemplary embodiments of the first aspect. The structure of the motor is described in the foregoing exemplary embodiments, the content thereof is incorporated herein, and description thereof is thus not repeated.

Through the electrical product of this exemplary embodiment, since the structure of the motor as described in the foregoing exemplary embodiments is adopted, by defining the recess on a portion of the edge of the cover of the motor and allowing the edge on the radially outer side of the recess to be in interference fit with the inner circumference of the housing of the motor, the cover and the housing may be fixed. Since only a portion of the edge of the cover needs to be processed into a form of interference fit with the housing, the processing process of the cover may be simplified, so that the processing process of the motor is further simplified. Besides, the recess is recessed on the surface of the cover from the axial side to the axial other side. Therefore, when the surface of the cover on the axial side is coated with the adhesive, excess adhesive may be accommodated in the recess, and that the adhesive coated on the cover is prevented from overflowing.

In this exemplary embodiment, the electrical product may be an electrical product using a motor. For example, the electrical product may be a vehicle-mounted product using a motor, such as an automotive electronic vacuum pump, an automotive brake, an automotive gearbox, and the like, a piece of information equipment, industrial equipment, etc. using a motor, or may be a home appliance such as an indoor unit of an air conditioner, an outdoor unit of an air conditioner, a water dispenser, a washing machine, a sweeper, a compressor, a blower, a mixer, and the like.

Features of the above-described preferred embodiments and the modifications thereof may be combined appropriately as long as no conflict arises. While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor, comprising:
a housing; and
a cover comprising a recess recessed on a surface of the cover from an axial side to an axial other side, wherein the recess is located on a portion of an edge on a radially outer side of the cover, an edge on a radially outer side of the recess is in interference fit with an inner circumference of the housing, and the surface of the cover on the axial side is used for being coated with an adhesive, wherein
the number of the recess is plural, and the recesses comprise a first recess and a second recess, wherein a width of an edge of the housing on the radially outer side of the first recess is less than or equal to a predetermined threshold, the width of the edge of the housing on the radially outer side of the second recess is greater than the predetermined threshold, and a volume of the first recess is greater than a volume of the second recess.

2. The motor according to claim 1, wherein
the volume of the recess corresponding to a narrowest portion of the edge of the housing is the largest.

3. The motor according to claim 1, wherein
the first recess is centered on a narrowest portion of the edge of the housing adjacent to the first recess and extends along both sides of the edge of the housing in a circumferential direction, viewed in an axial direction, a cross-section of the first recess is substantially strip-shaped extending in the circumferential direction, and/or
viewed in the axial direction, a cross-section of the second recess is a portion of a substantially-circular circle.

4. The motor according to claim 1, wherein
when the number of the second recess is plural, shapes of the second recesses are the same.

5. The motor according to claim 1, wherein
the cover further comprises an ear portion protruding towards the radially outer side, the ear portion is located on a portion of the edge on the radially outer side of the cover, viewed in a radial direction, the ear portion and the recess do not overlap, and
the housing comprises an accommodating portion for accommodating the ear portion.

6. The motor according to claim 5, wherein
the number of the ear portion is plural, and the ear portions are uniformly distributed in a circumferential direction substantially.

7. The motor according to claim 5, wherein
an edge of the housing comprises a hole portion, the recess of the cover is located on both sides of the hole portion in a circumferential direction, and a width of the edge of the housing on the radially outer side of the recess is less than the width of the edge of the housing at the hole portion.

8. The motor according to claim 7, wherein
the hole portion is disposed on the edge of the housing on a radially outer side of the ear portion.

9. An electrical apparatus, comprising the motor according to claim 1.

* * * * *